(12) United States Patent
Stass et al.

(10) Patent No.: US 9,107,054 B2
(45) Date of Patent: *Aug. 11, 2015

(54) SYSTEMS AND METHODS FOR FACILITATING MEDIA CONNECTIONS

(75) Inventors: Adam Stass, Houston, TX (US); Dustin Yu, Houston, TX (US)

(73) Assignee: AYU Technology Solutions LLC, Houston, TX (US)

(*) Notice: Subject to any disclaimer, the term of this patent is extended or adjusted under 35 U.S.C. 154(b) by 262 days.

This patent is subject to a terminal disclaimer.

(21) Appl. No.: 13/559,463

(22) Filed: Jul. 26, 2012

(65) Prior Publication Data

US 2013/0023249 A1 Jan. 24, 2013

Related U.S. Application Data

(63) Continuation-in-part of application No. 13/302,960, filed on Nov. 22, 2011.

(60) Provisional application No. 61/416,228, filed on Nov. 22, 2010.

(51) Int. Cl.
*H04W 4/16* (2009.01)
*G06Q 10/10* (2012.01)

(52) U.S. Cl.
CPC *H04W 4/16* (2013.01); *G06Q 10/10* (2013.01)

(58) Field of Classification Search
CPC ........... G06F 3/00; G06F 3/048; G06F 15/16; G06F 3/0482; G06F 1/1626; G06F 3/0481; G06F 9/44543; G06Q 50/01; G06Q 10/10; G06Q 1/1626; G06Q 10/107; H04L 29/06; H04L 12/581
USPC ......... 715/733, 751, 752, 753, 758, 764, 765, 715/781, 810, 835, 839, 864; 345/169; 709/204; 705/319
See application file for complete search history.

(56) References Cited

U.S. PATENT DOCUMENTS

| 6,434,599 | B1 * | 8/2002 | Porter | 709/204 |
|---|---|---|---|---|
| 7,694,235 | B2 * | 4/2010 | Stautner et al. | 715/835 |
| 2008/0209351 | A1 * | 8/2008 | Macadaan et al. | 715/762 |
| 2010/0058200 | A1 * | 3/2010 | Jablokov et al. | 715/752 |
| 2011/0022450 | A1 * | 1/2011 | Meredith | 705/14.4 |
| 2014/0098949 | A1 * | 4/2014 | Williams | 379/265.09 |

* cited by examiner

*Primary Examiner* — Xiomar L Bautista
(74) *Attorney, Agent, or Firm* — Klarquist Sparkman, LLP

(57) ABSTRACT

A method of connecting consumers with third parties includes prompting a user to enter search information on the mobile device about an entity that the user is seeking to contact, conveying information about one or more entities to the user based on retrieved entity information, and initiating a communication connection between the user and the indicated entity.

20 Claims, 18 Drawing Sheets

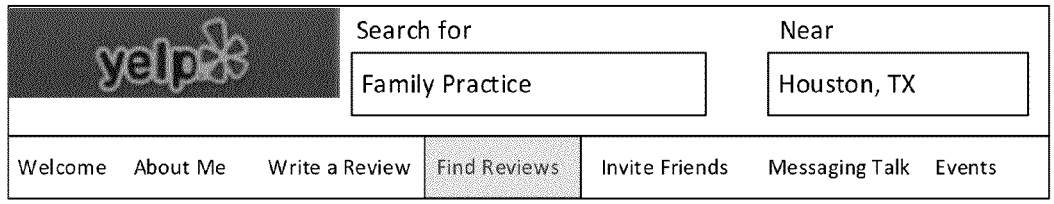
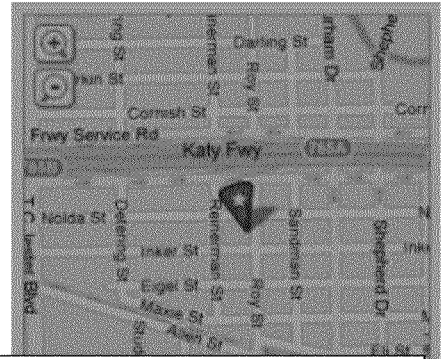

Hayley Nguyen, MD

Category: Family Practice
5151 Katy Fwy
Ste 100
Houston, TX 77007

(555) 555-4101

After the visitor conducts a search using Yelp, the visitor can connect with the listing instantly by clicking on the Connect NOW button.

Once clicked on, it will open up the chat window below connecting the visitor with the listing through chat, lead form, or click-to-call.

Hayley Nguyen, MD www.drnguyen.net

Welcome to Live Chat. Please answer the following questions to begin:

Your Name:

Your Email:

Your Question:

[click here to start typing]

Connect

This is the first stage of the chat window whenever the listing operators are online and available for chat.

The visitor will fill out whatever information is required by the listing to secure the lead. This part is fully customizable and can change the entire look of the window to match their website's look or logo as well as ask specific questions (e.g. ID#, or "Have you used us before?")

Once filled out, it will engage the visitor with the listing for a live online chat.

FIG. 1

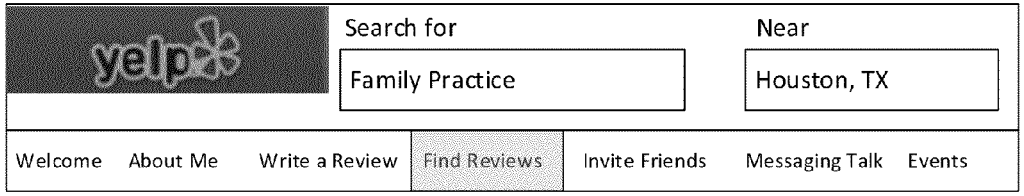

Welcome   About Me   Write a Review   Find Reviews   Invite Friends   Messaging Talk   Events Hayley Nguyen, MD

Category: Family Practice
5151 Katy Fwy
Ste 100
Houston, TX 77007

(555) 555-4101

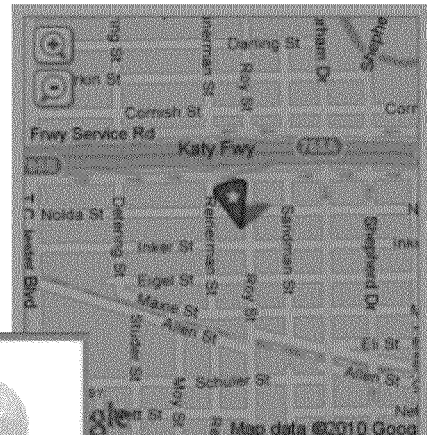

Hayley Nguyen, MD www.drnguyen.net

Dr. Nguyen: Hello, may I help you?

Visitor: I would like to make an appointment to come see you today.

Dr. Nguyen: I have an opening at 2:15pm today. Would you like to reserve that time?

Visitor: Yes, thanks!

[click here to start typing]

Send Message

This is the chat stage of the chat window. Once connected, the visitor and the listing will engage in a chat to chat about anything from receiving more information about their company to making an appointment.

The conversation is instant and help connect the visitor who was originally just browsing to making an appointment at a family practice. It saves time for both the visitor and the client.

If the client has a smart phone, they are able to take this chat through their phone while on-the-go so they can be efficient and readily available.

FIG. 2

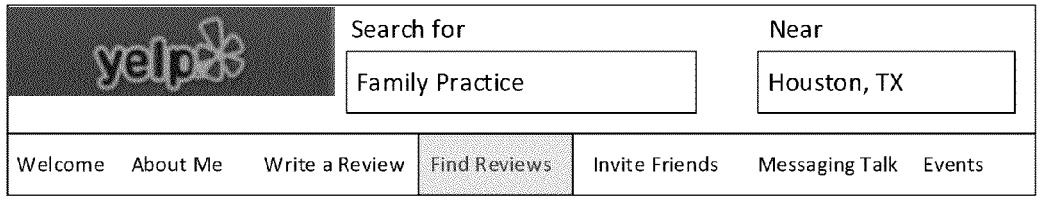

Hayley Nguyen, MD

Category: Family Practice
5151 Katy Fwy
Ste 100
Houston, TX 77007

(555) 555-4101

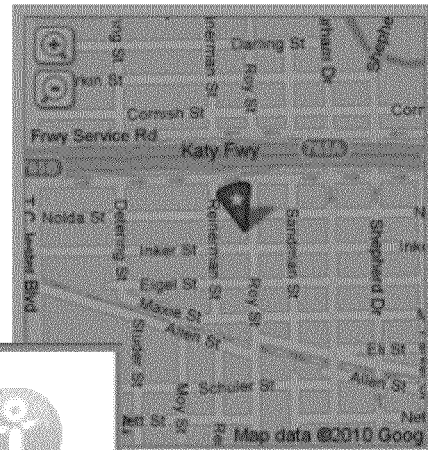

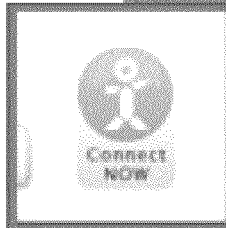

Hayley Nguyen, MD www.drnguyen.net

Sorry, but we are not available at the moment. Please leave us a message and we will get back to you as soon as possible. Thank you.

Your Name:
Your Email:
Your Question:

[click here to start typing]

Connect

This is the offline stage of the chat window. When the listing is unavailable for chat and the visitor clicks on the Connect NOW button, the offline message/lead form will appear.

This is where the visitor can leave a message to the listing in which the message will be emailed to the listing's email address instantly so the listing can contact the visitor when they check their email.

(you can also customize this form to ask for additional information as well)

FIG. 3 yp CLICK LESS. LIVE MORE.

Find a Business: car wash
Find a Person: Houston, TX
Maps & Directions
FIND

Houston Car Wash

Division 1 Carwash & Detail (555) 555-2668

Pop-A-Ding (555) 555-1700

POP-A-DING

Welcome to Live Chat. Please answer the following questions to begin:

Your Name:
Your Email:
Your Question:

Connect

Search results for Car Wash in Houston, TX, 1-3 of 364

1. Pop-A-Ding
(555) 555-1700
>> Website

2. Dr. Wash Car Wash
(555) 555-8833
>> Website

3. Bubbles Car Wash
(555) 555-9274
>> Website

FIG. 4

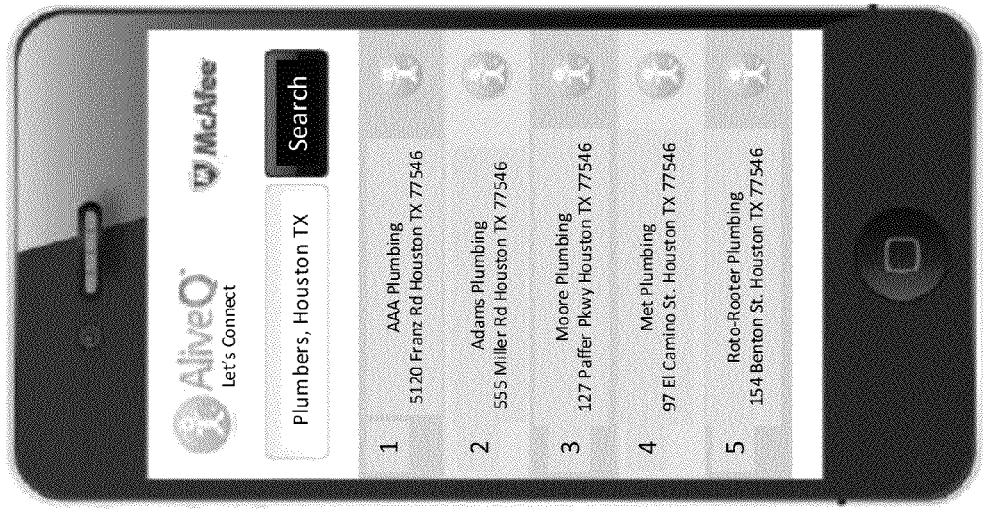
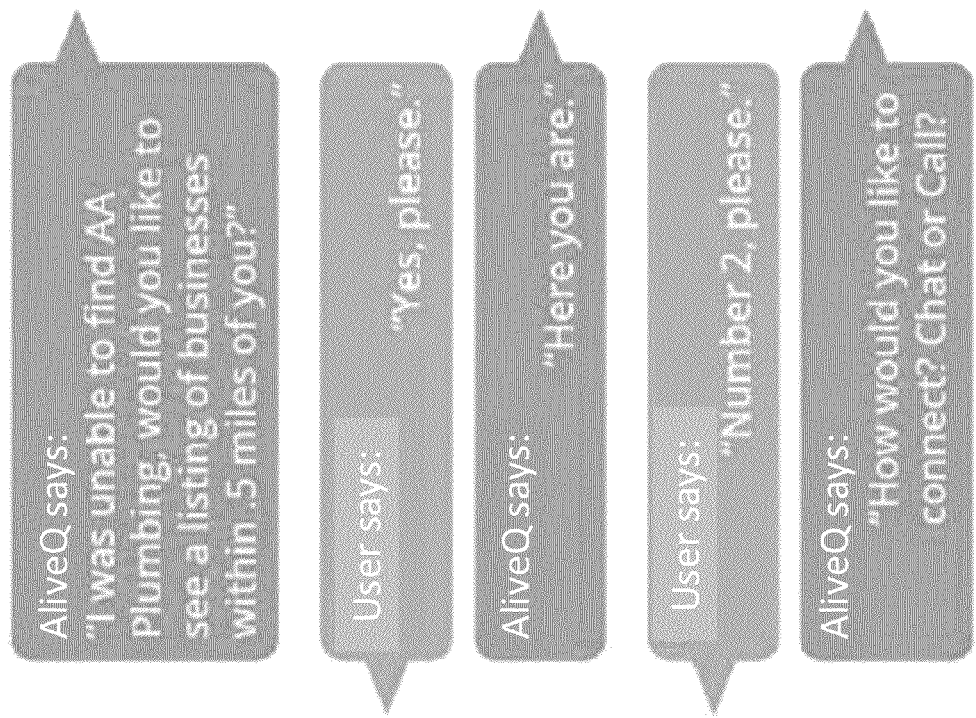
FIG. 12

US 9,107,054 B2

SYSTEMS AND METHODS FOR FACILITATING MEDIA CONNECTIONS

CROSS-REFERENCE TO RELATED APPLICATION

This application is a continuation-in-part of U.S. application Ser. No. 13/302,960, filed on Nov. 22, 2011, which claims the benefit of U.S. Provisional Application No. 61/416,228, which was filed on Nov. 22, 2010, and is incorporated herein by reference in its entirety.

FIELD

The present disclosure is directed to methods and systems for providing and facilitating media connections and, in particular, for facilitating live chat communications.

BACKGROUND

Live chat services are available in various forums where a known host (e.g., a company or business) provides a user (e.g., a customer or client) with the ability to engage directly with the host. In this manner, conventional live chat services allow users to send and receive text communications with the host to request information or services from the host. However, such conventional live chat systems only allow users to engage the host of the live chat services—they do not allow users to directly connect and communicate with parties other than the host.

In addition, in conventional live chat services, the host generally has an active call center staff that is available to receive and respond to requests for live chats during specified hours. If the request for chat services is made outside of the specified hours, a live chat is not initiated and the user must wait until the live chat services is next available.

SUMMARY

The following embodiments remedy the deficiencies of conventional live chat services as described above.

In one embodiment, a method of connecting users with third parties using a mobile device is provided. The method can include, for example, prompting a user to enter search information on the mobile device about an entity that the user is seeking to contact, receiving the search information from the user via the mobile device, and retrieving entity information from a remote database. The information can be conveyed to the user about one or more entities based on the retrieved entity information. An indication can be received from the user that the user would like to connect with one of the entities conveyed to the user and a communication connection can be initiated between the user and the indicated entity.

In another embodiment, a method of connecting consumers with third parties is provided. The method includes providing one or more widgets adjacent a plurality of directory listings of third parties on webpage, with each widget being associated with one of the third parties. An indication can be received that a consumer has executed one of the widgets. The consumer and third party can be connected in a live chat session in response to the execution of the widget. The live chat session can be configured to allow direct communication between the consumer and the third party.

In some embodiments, the act of connecting the consumer and third party in the live chat session comprises opening a new window in a browser of the consumer. In other embodiments, when the third party is not available, the consumer is provided a message indicating the unavailability of the third party. The consumer can be provided with the opportunity to leave a message for the third party when the third party is not available. In addition, or alternatively, the consumer can be provided with an option to communicate directly with an intermediary live chat operator. In some embodiments, the third party can communicate with the consumer in the live chat session using a text messaging device, such as a smartphone.

The foregoing and other objects, features, and advantages of the invention will become more apparent from the following detailed description, which proceeds with reference to the accompanying figures.

BRIEF DESCRIPTION OF THE DRAWINGS

FIG. 1 is a marked-up exemplary screenshot of a directory listing of a third party, indicating a Live Chat introduction window that is opened when an instant chat widget is executed (e.g., the Connect NOW! widget).

FIG. 2 is a marked-up exemplary screenshot of a Live Chat introduction window illustrating a chat between a consumer and a third party (e.g., a medical doctor).

FIG. 3 is a marked-up exemplary screenshot of a directory listing of a third party, indicating a Live Chat introduction window that is opened when an instant chat widget is executed (e.g., the Connect NOW! widget) and the third party is not available.

FIG. 4 is a marked-up exemplary screenshot of another directory listing of a third party, indicating a Live Chat introduction window that is opened when an instant chat widget is executed (e.g., the Connect NOW! widget).

FIG. 12 illustrates a screenshot of an app configured to connect users with third parties via a mobile device, and an exemplary voice response exchange.

DETAILED DESCRIPTION

Figure 5:
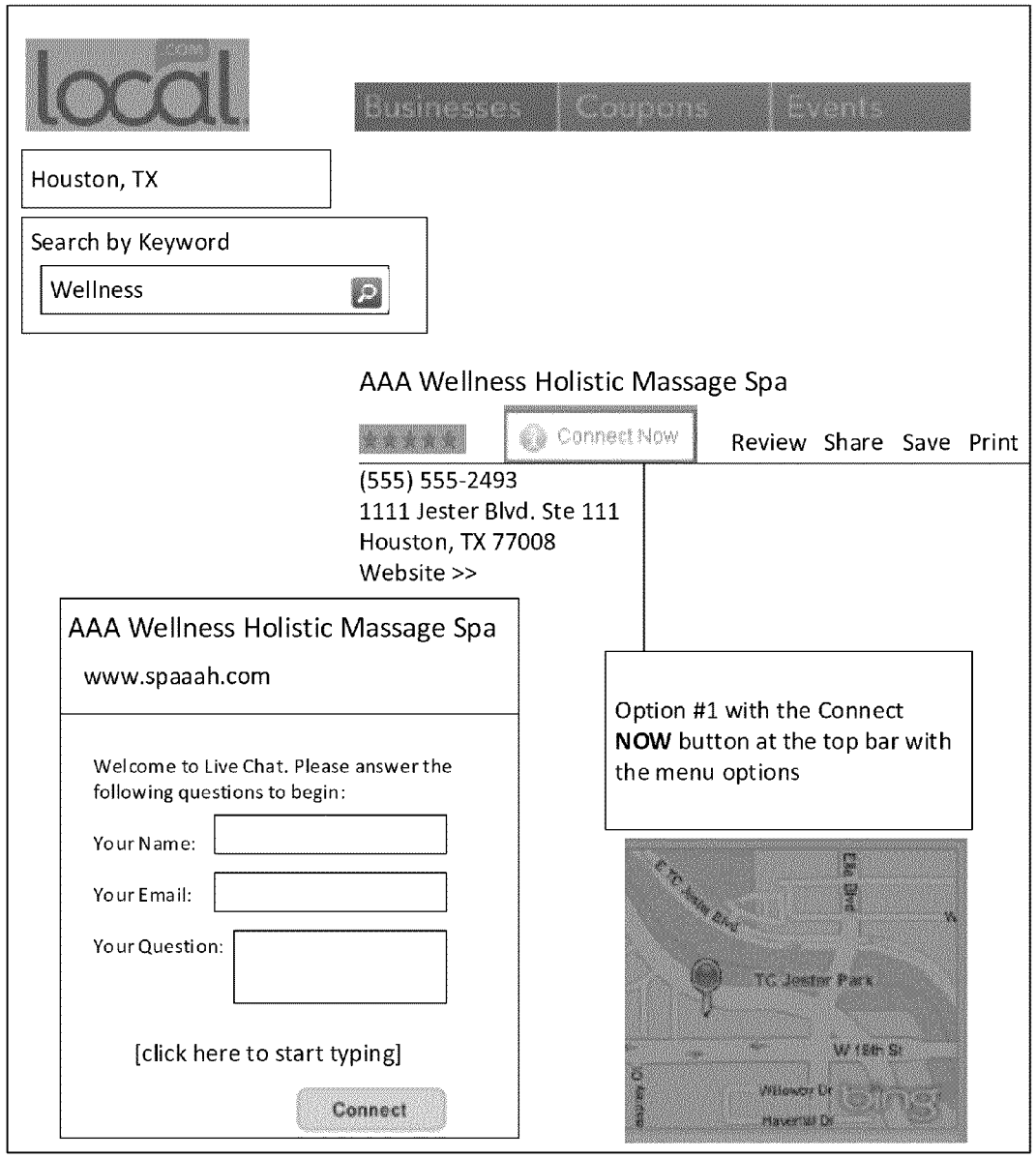
FIG. 5 is a marked-up exemplary screenshot of yet another directory listing of a third party, indicating a Live Chat introduction window that is opened when an instant chat widget is executed (e.g., the Connect NOW! widget).

For purposes of this description, certain aspects, advantages, and novel features of the embodiments of this disclosure are described herein. The disclosed methods, apparatuses, and systems should not be construed as limiting in any way. Instead, the present disclosure is directed toward all novel and nonobvious features and aspects of the various disclosed embodiments, alone and in various combinations and sub-combinations with one another. The methods, apparatus, and systems are not limited to any specific aspect or feature or combination thereof, nor do the disclosed embodiments require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "determine" and "provide" to describe the disclosed methods. These terms are high-level abstractions of the actual operations that are performed. The actual operations that correspond to these terms may vary depending on the particular implementation and are readily discernible by one of ordinary skill in the art.

Implementations of Methods and Systems Using Software

The systems and methods described herein may be implemented or performed by software stored on one or more tangible computer-readable media (e.g., one or more optical media discs, volatile memory or storage components (such as DRAM or SRAM), or nonvolatile memory or storage components (such as hard drives)) and executed on one or more computing systems. The computing systems can include one or more central processing units (CPUs) and a memory, such as random access memory (RAM) for temporary storage of information and/or a read only memory (ROM) for permanent storage of information, and a mass storage device, such as a hard drive, diskette, or optical media storage device.

Such software can be executed on a single computer or on a networked computer (e.g., via the Internet, a wide-area network, a local-area network, a client-server network, or other such network). The systems and methods disclosed herein can also be performed using cloud computing, a form of Internet-based computing, whereby shared resources, software and information are provided to computers and other devices on-demand. The software embodiments disclosed herein can be described in the general context of computer-executable instructions, such as those included in program modules, which can be executed in a computing environment on a target real or virtual processor.

The computing system may run on a variety of computing devices, such as, for example, a server, a Windows server, a Structure Query Language server, a Unix server, a personal computer, a mainframe computer, a laptop computer, a mobile device (e.g., a smartphone, cellphone, a personal digital assistant), a kiosk, an audio player, and so forth. As described in more detail below, in certain embodiments, mobile devices can provide access to live chat connections, thereby providing a user with a synchronous or nearly synchronous chat environment. As used herein, "mobile devices" and/or "smartphone devices" means any mobile telephone offering advanced capabilities and having PC-like functionality or any mobile phone that runs complete operating system software and provides a standardized interface and platform for applications. Examples of current smart phone type devices, operating systems, and manufacturers include, but are not limited to, the APPLE IPHONE™, ANDROID™ WINDOWS MOBILE OS™, BLACKBERRY™, and others.

Furthermore, any of the software embodiments (comprising, for example, computer-executable instructions for causing a computer to perform any of the disclosed methods) can be transmitted, received, or accessed through a suitable communication means. Similarly, any data structure, data file, intermediate result, or final result created or modified using any of the disclosed methods can be transmitted, received, or accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means now known or unknown. Moreover, any data structure, data file, intermediate result, or final result produced by any of the disclosed methods can be displayed to a user using a suitable display device (e.g., a computer monitor or display). Such displaying can be performed as part of a computer-implemented method of performing any of the disclosed methods.

As used herein, the term "widget" refers to a software widget configured for use with a website or other information-displaying medium. When used within a website, widgets are relatively small applications that can be installed on a webpage and executed by clicking on an icon representative of the widget that is positioned within the webpage. The execution of the widget can cause a new window to open, such as a live chat window, to provide a means of communication between a consumer and a third party. The term widget also includes applications that, in some cases, can be referred to using any of the following terms: portlet, gadget, badge, module, webjit, capsule, snippet, mini and/or flake. In some embodiments, the widgets are created in DHTML, JavaScript, and/or Adobe Flash.

Integration of "Connect NOW!" System with Directory Listings

The systems and methods illustrating integration of the ConnectNow! with various other systems allows businesses to reach more customers at a faster and more efficient process. As a result, more effective communications can be achieved providing numerous advantages, including, in some embodiments, higher sales due to increased customer communication.

The systems and methods described herein can function to connect users with third parties by a simple and direct connection device. In one embodiment, a widget can be provided adjacent a listed profile within a directory. Such directory listings are currently available to provide consumers with directories of people, businesses, and services and include such listings as YELP™, YP, Local, CitySearch, etc. The selection of the widget by clicking on the icon associated with the widget can instantly connect the user with third party identified in the listing.

As shown in FIG. 1, for example, an exemplary directory listing on Yelp is displayed. An icon, such as the "Connect NOW" icon shown in FIG. 1, can be positioned on the webpage adjacent information about the person, business, and/or service being listed. In the example shown in FIG. 1, a medical doctor is identified and the "Connect NOW" icon is positioned immediately below the address and contact information of the medical doctor.

Figure 6:
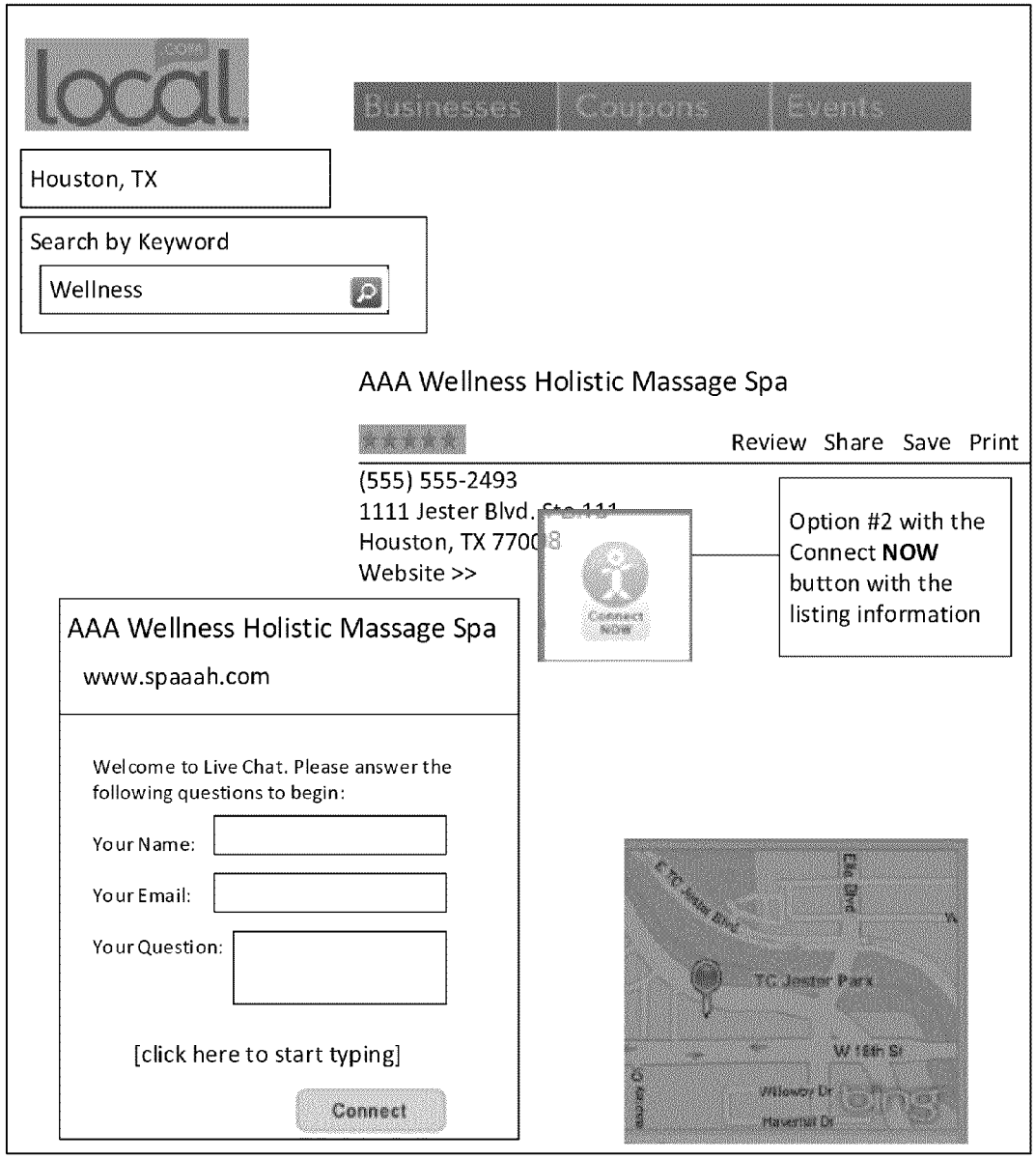
FIG. 6 is a marked-up exemplary screenshot of yet another directory listing of a third party, indicating a Live Chat introduction window that is opened when an instant chat widget is executed (e.g., the Connect NOW! widget).

The location of the icon on the screen can vary; however, it is preferably displayed near the address and/or other contact information of the third party. FIGS. 4, 5, and 6 illustrate additional examples of directory listings with a "Connect NOW" icon positioned adjacent address and contact information of other third parties (i.e., a car wash business in FIG. 4 and a wellness business in FIGS. 5 and 6).

To directly engage a person, business, or service (e.g., the medical doctor shown in FIG. 1), a user (e.g., a consumer) can simply execute the Connect NOW! widget that is tied to the business's directory listing by clicking on the icon that represents the widget. As shown in FIG. 1, once the Connect NOW! widget is executed, the consumer can be prompted to enter certain identifying and/or information data in a window or other text-entry area. For example, the consumer can be asked to enter his/her email address and present a question or other request for information to the person, business, or service (e.g., the medical doctor shown in FIG. 1).

Once the information is completed and entered, the consumer can be directly connected to the person, business, or service via a live chat connection. FIG. 2 illustrates a live chat stage of an instant connection between a consumer and a third-party person, business, or service. In the chat stage, the consumer and third-party person, business, or service can engage in a chat about anything from receiving more information about the offered services to making a specific appointment to engage the services of the third-party person, business, or service.

In some embodiments, both the consumer and third party accounts can be accessed via either web applications on the Internet or via a mobile device application. This allows both the consumer and third party to engage in live chat conversations and exchange messages, regardless of whether they are at work, home, or other locations in between. In addition, if one or both of the consumer and third party are not available to engage in a live chat, the messages can be saved in a central location and the consumer and/or third party can receive instant alerts via text message or push notification as to when the other party responds. As described above, accessing the live chat systems described herein using mobile devices, such as cellphones, smartphones and the like, can provide nearly instantaneous chat connections.

As shown in FIG. 3, if the third party is not immediately available to chat, a message can be left for the business and answered when the business is available to reply. The message will be delivered to the third party (e.g., the person, business, or service) and the third party can respond to the message at their earliest opportunity.

If the third party is not immediately available, in some embodiments an intermediary live chat service can be offered to the consumer. The intermediary live chat service can comprise, in some embodiments, a live answering service that is equipped with knowledge of the third party so that they can assist in answering the customer's question, or just otherwise capturing a new lead (e.g., a potential business lead or other benefit) for the third party.

As discussed above, a widget or other internet-connection member can be provided to provide live connection functionality to a website such as YELP™. In other embodiments, however, a live connection business search portal can be provided in which all, or substantially all, businesses are provided with live connection comment (e.g., live chat, click to call, sms text notification, etc.) so that a person searching can connect in real time to the business.

Unified Inbox

Once a third party (e.g., a business) receives a request from a consumer, whether it is a live chat or message, they can immediately reply directly to the customer. In addition, all live chats and messages can be gathered and delivered to a central, unified system. In this manner, businesses no longer have to go through multiple systems—separate email accounts, cell phone text messages, etc., to respond to customers. This provides a much more responsive and efficient method of communicating and connecting consumers and third parties because consumers can get an instant, real-time synchronous replies, or, in some circumstances, delayed—but not by much—asynchronous replies. Accordingly, the instant connection provided by the Connect NOW! systems and methods described herein allow consumers and third parties to connect directly with each other, and respond in the shortest time possible.

Indicators of Live Chat Responsiveness

In some embodiments, third parties that utilize the Connect NOW! service will also receive an indicator of their promptness in responding to requests for information. This indication can also be me available to consumers looking to connect with third parties. For example, a scale can be provided to display and show to consumers expected response times of a particular third party. Thus, for example, the indicator can show 100% active—live chat ON, 50% active—the third party will reply within 4 hours, 25% active—the third party will reply within 24 hours, or 0% active—no reply guaranteed. Of course, other status indicators and systems of displaying responsiveness can be implemented. This status indication can be monitored and updated over time to reflect accurate responsiveness of third parties.

Accordingly, as described herein, the various systems and methods allows consumers to contact businesses to communicate in real-time via live chat, click-to-call, self-service, or offline form modes of communication. When the communication occurs via the live chat mode, customers or other persons can initiate the live chat with the business resulting in both parties being engaged in a real time text chat conversation. When the communication occurs via the click to call mode, a customer or other person can initiate a click to call request with a business by entering their phone number into the system, causing the system to connect them to the business through a phone call.

When the communication occurs via the self service mode, a business can provided pre-determined answers to frequently asked questions which are later accessible to the customer if they choose not to communicate with the business in other methods. Thus, at least in some embodiments, the self service mode of communication can automate the answering of customer inquiries before needing to directly involve the business.

When the communication occurs via the offline form mode, customers can leave one or more messages via an offline form. In some embodiments, the customer can include their inquiry along with their contact information, and the business receives a notice shortly thereafter, allowing them to reply to the customer at their earliest convenience. Although this approach can be the slowest form of communication between the customer and business, it also potentially requires the least amount of involvement from the business since the business can choose the time to respond to the inquiry.

The system can include a widget or other internet-based container. In HTML terms, the container can be a pop-up browser window or DIV layer that resides on a web page. These systems can be integrated with information-containing systems (such as websites and webpages) in various manners. For example, widgets, as described herein, can be embedded within a web directory listing, social networking profile page, web kiosk, Windows/Mac application, etc. In some embodiments, a business can receive and send messages with any internet connected device such as a desktop computer or mobile phone or tablet.

Mobile Applications and Other Similar Methods and Systems

In one embodiment, the system can comprise an application that can be utilized with any smartphone or similar device that is capable of downloading applications (i.e., "apps"). In order to facilitate connection of users with services, upon launching the app, the user can receive one or more prompts to enter information about the business that is sought. In some embodiments, interactive voice response (IVR) technology can be provided in combination with an application that can be used on a smartphone (or other similar device) to allow direct connection of users with business (e.g., industry services, restaurants, and other such businesses). As a result, increased connectivity between users and businesses can be achieved providing numerous advantages, including, in some embodiments, higher sales due to increased customer communication.

Although many embodiments disclosed herein use IVR and such systems have certain advantages over other approaches, it should be understood that the prompts and responses can also be achieved using text prompts by the system and text entry by the user. In some embodiments, the user can choose between using an IVR system and a text-based query and response system.

Figure 7:
FIG. 7 illustrates a screenshot of an app configured to connect users with third parties via a mobile device.

FIG. 7 illustrates an embodiment in which a user can enter information about what the user is seeking. For example, the user can enter information about a business or other service. The user can enter this information by various means, including entering information through an input device (e.g., a virtual or physical keyboard). As noted above, in a preferred embodiment, the prompt and method of entry is voice-activated. For example, the user can be prompted to respond to a voice query such as "What city or zip code?" and, in an IVR embodiment, the user can respond by stating a numeric zip code such as "18929."

If desired, the locational information can be configured to be received based on location-providing information resident with the device (e.g., smartphone), such as GPS. In such embodiments, the system can be figured so that the app automatically seeks local businesses, allowing the user to skip the first query prompt. FIG. 7, for example, shows an embodiment where businesses within 5 miles of the user's devices are listed. However, this feature can be deactivated (or otherwise ignored) allowing the user to enter in the subject of their search.

In addition to receiving the zip code (or other location information, such as city/state, passive GPS information, etc.), the user can enter the business that is sought. For example, the user can be prompted to respond to a text and/or voice query such as "What can we help you find?" In response to the second query, the user can respond, for example, either generically (about the type of service sought) or specifically (about a specific business). For example, the user could respond generically with "Plumber" or specifically with "Joe's Plumbing Service."

Figure 8:
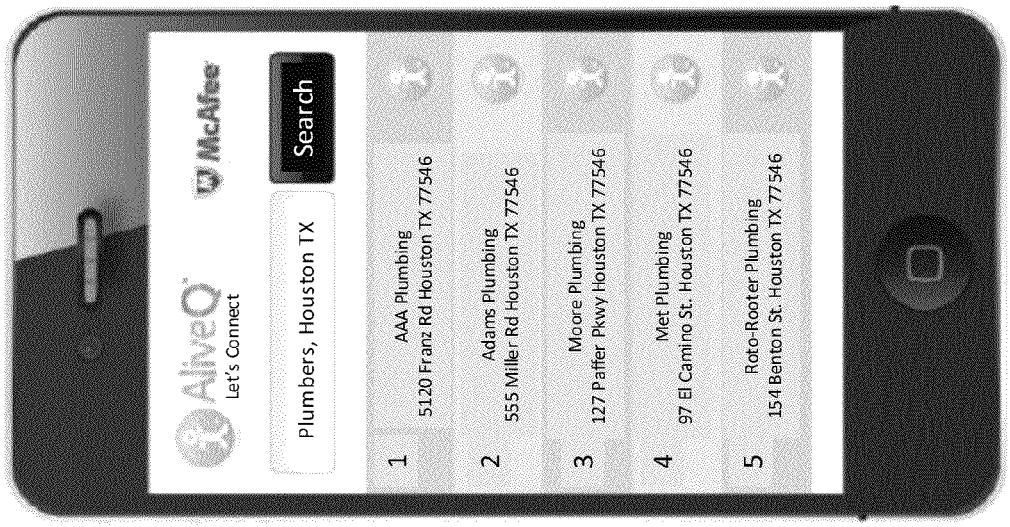
FIG. 8 illustrates another screenshot of an app configured to connect users with third parties via a mobile device.

As shown in FIGS. 7 and 8, in some embodiments, the user can enter information about the type of business and location in one step. Thus, for example, a user could enter "Plumbers, Houston, Tex.) and be immediately directed to results based on that query as show in FIG. 8.

As shown in FIG. 8, if the response provided to the second query is generic (e.g., "plumbers" instead of "Joe's Plumbing Service", the app can respond by listing some or all of the results. Alternatively, the app can indicate the number of results (e.g., the results of the queried businesses) in the area and inform the user of that number. For example, the app can indicate, "We have found five plumbers in your area." Then the user can be prompted to select one of the results. For example, the app could say, "press 1 to hear the results in order."

The system can be also configured to have premier providers. Premier providers can be business that are highly rated by the application and/or which have otherwise been selected to receive special status (e.g., by payment of advertising fees). In such a case, for example, the user can be prompted to "press 2 to be connected directly to the premier provider of _____ services in the location you have selected."

If a specific business is provided to the app (e.g., Joe's Plumbing Service) and that specific business is found by the system, the app can directly connect the user with the business. If the business is not found, the user can be prompted to restate the business name or to hear results relating to the type of business sought.

Figure 9:
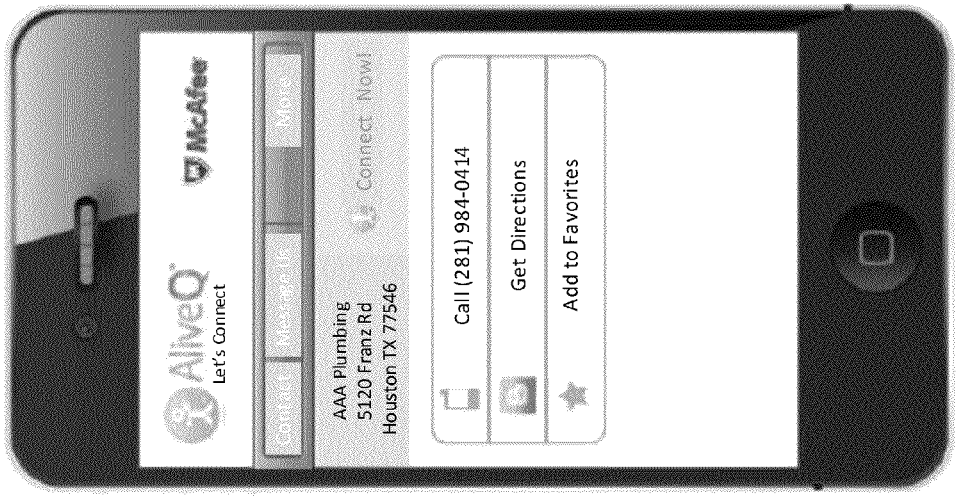
FIG. 9 illustrates another screenshot of an app configured to connect users with third parties via a mobile device.

FIG. 9 illustrates a screenshot after the user has selected one of the found service providers. As shown in FIG. 9, once a user has selected a listing, the user can be provided various options for communicating with the business, including, for example, calling the business, live chat, click-to-call, open table bookings, directions, and/or accessing one or more websites.

In one embodiment, for example, by using the IVR features described herein, a user of the app can be directly connected to a business using the smartphone or other device. In addition, once connected, the user can receive the same services and features described elsewhere herein, including for example, leaving messages, being redirected to intermediate answering services, and/or receiving automated information about a call back from the business selected.

Figure 10:
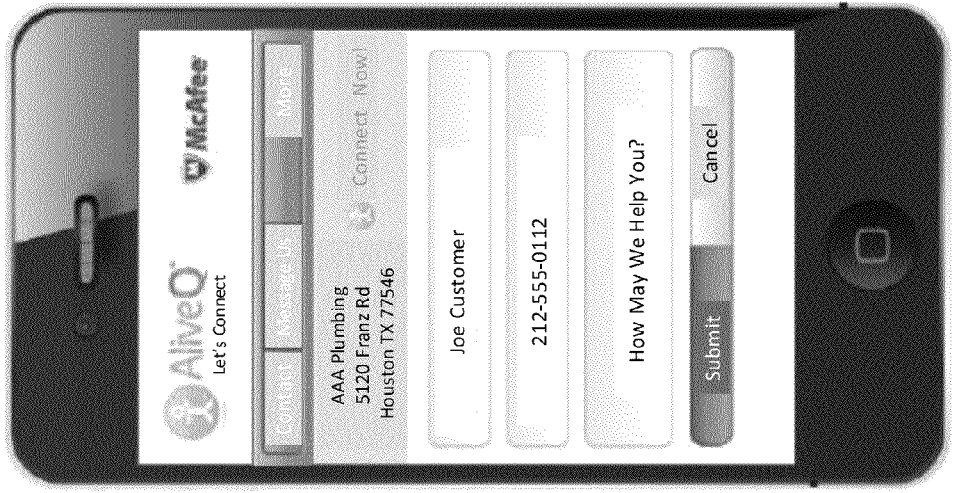
FIG. 10 illustrates another screenshot of an app configured to connect users with third parties via a mobile device.

As shown in FIG. 9 contact information can be provided for the selected service provider (i.e., "AAA Plumbing"). The user can call the business, get directions to the business location, and/or add the business to a "favorites list." As shown in FIG. 10, the user can also "message" the business by selecting the "message us" tab. Messaging can include, for example, initiating a voice chat session.

Figure 11:
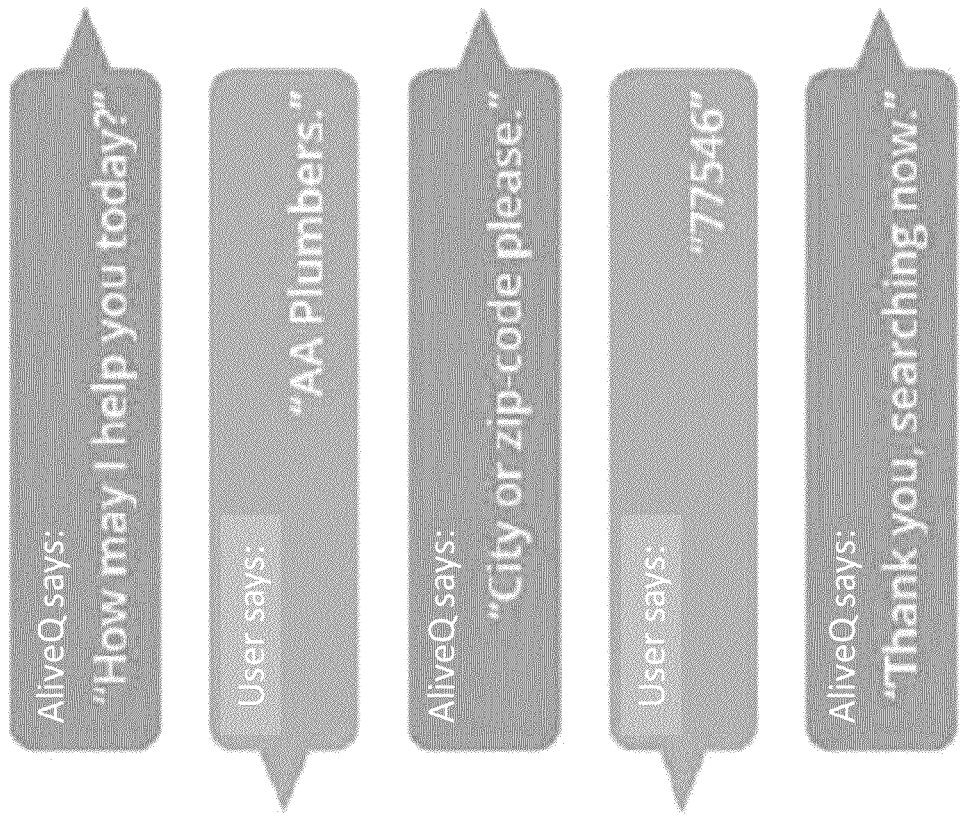
FIG. 11 illustrates a screenshot of an app configured to connect users with third parties via a mobile device, and an exemplary voice response exchange.
Figure 13:
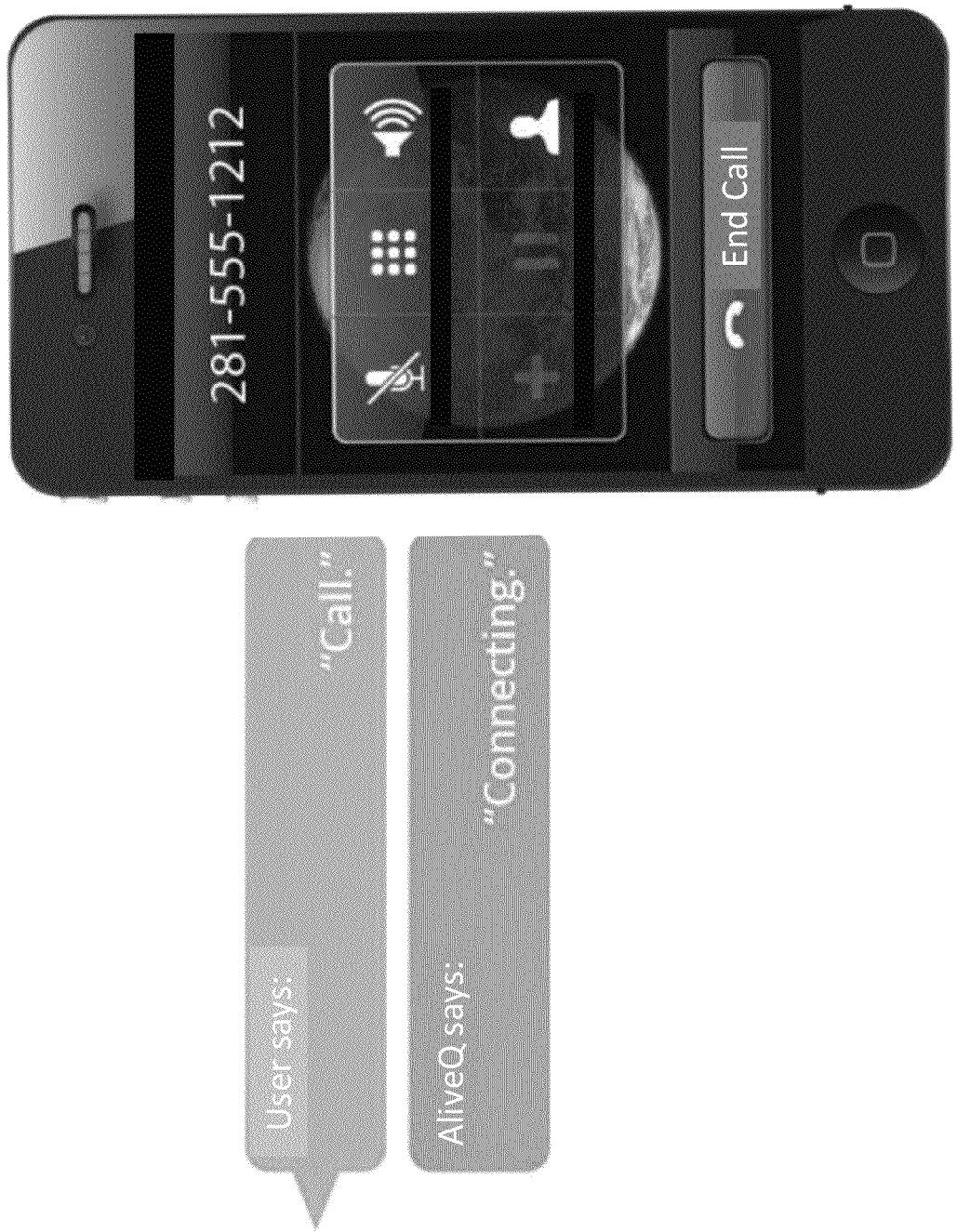
FIG. 13 illustrates a screenshot of an app configured to connect users with third parties via a mobile device, and an exemplary voice response exchange.
Figure 14:
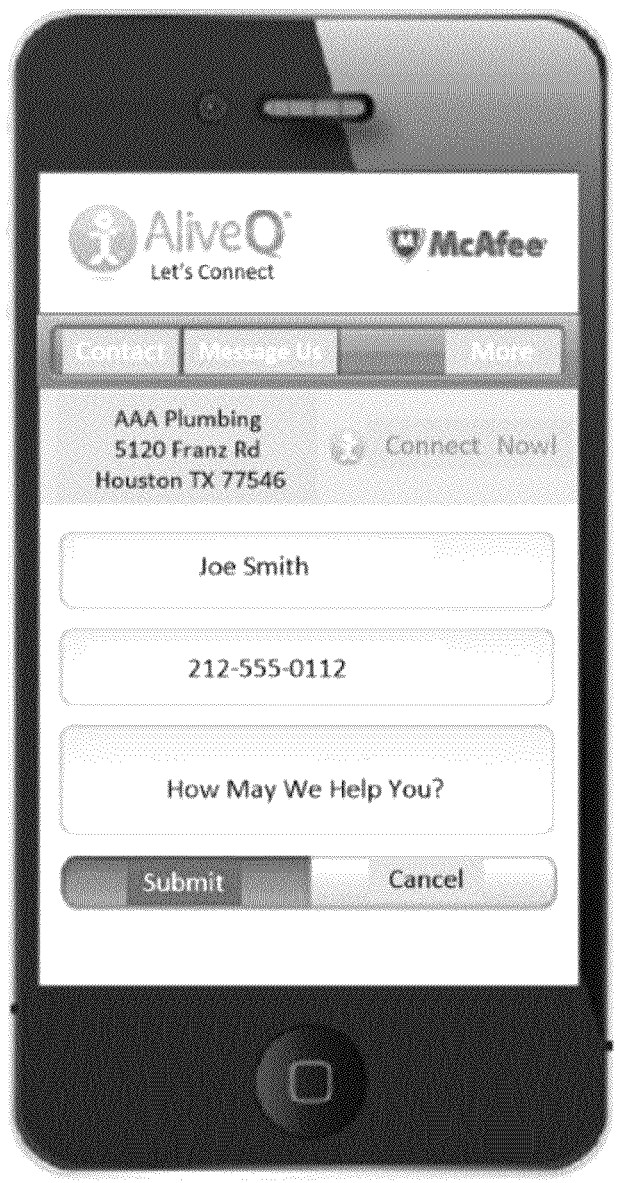
FIG. 14 illustrates a screenshot of an app configured to connect users with third parties via a mobile device, and an exemplary voice response exchange.

FIG. 11 illustrates an exemplary IVR exchange between the user and app. In this exchange, for example, the user is prompted to provide information about a business that it is seeking. As shown in FIG. 12, if an originally requested listing is not found, the app can prompt the user to return results to choose from based on the original search query. FIG. 12 illustrates an IVR exchange where the user is prompted to see local business and selects one of the businesses for initiating a contact. As shown in FIG. 13, the user can also select the manner in which the business is contacted (e.g., Chat or Call).

Figure 15:
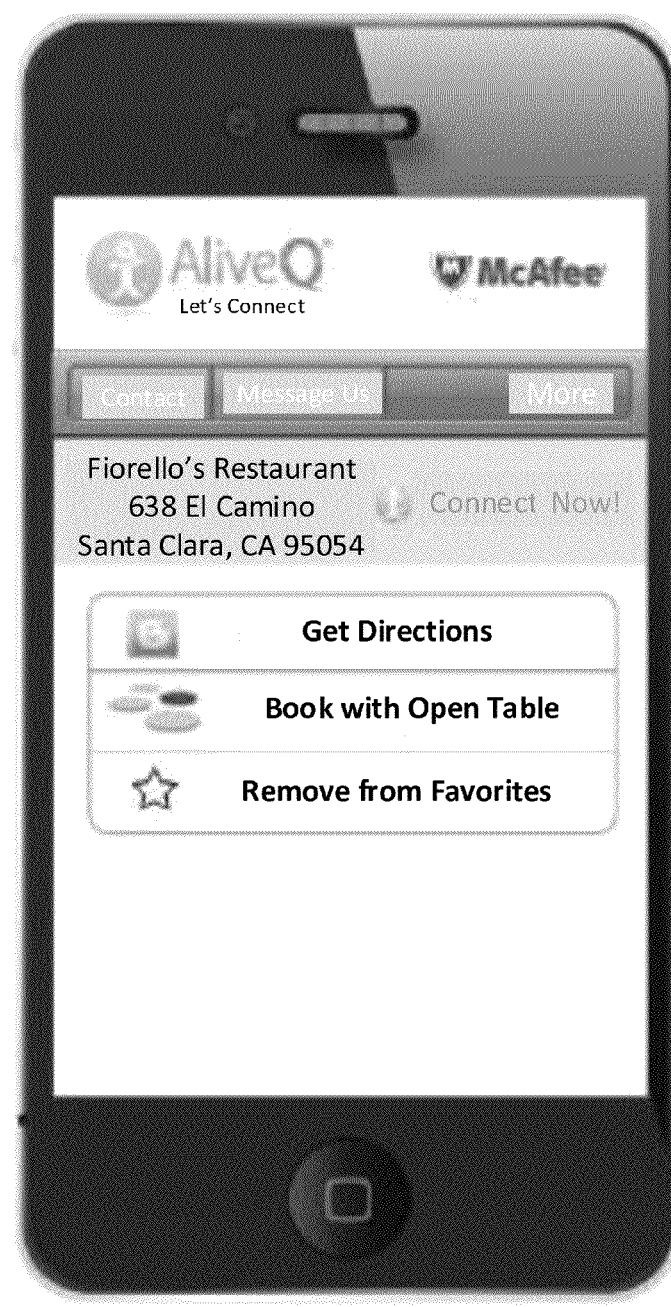
FIG. 15 illustrates another screenshot of an app configured to connect users with third parties via a mobile device.
Figure 17:
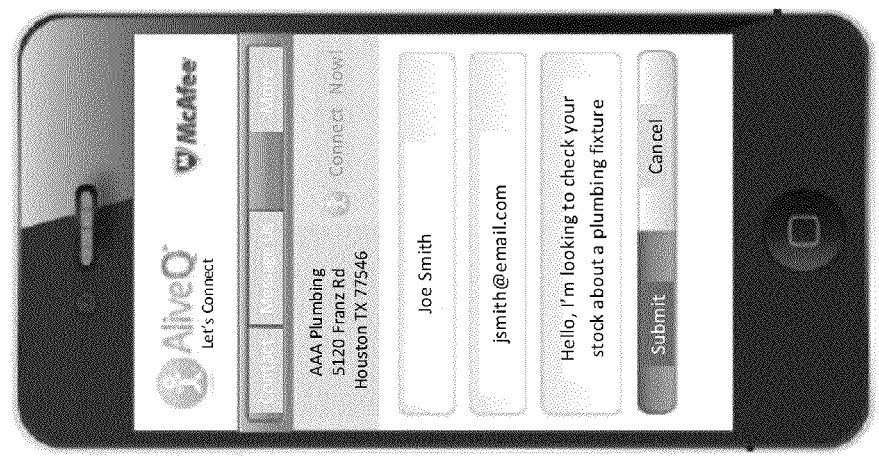
FIG. 17 illustrates another screenshot of an app configured to connect users with third parties via a mobile device.

FIG. 15 illustrates additional services that can be accessed by the app. For example, after selecting a business, by selecting the tab "more," a user can be given the option to choose "get directions," "book with Open Table" (if the business is applicable to the OPEN TABLE™ online reservation service), and/or "remove from favorites."

Figure 16:
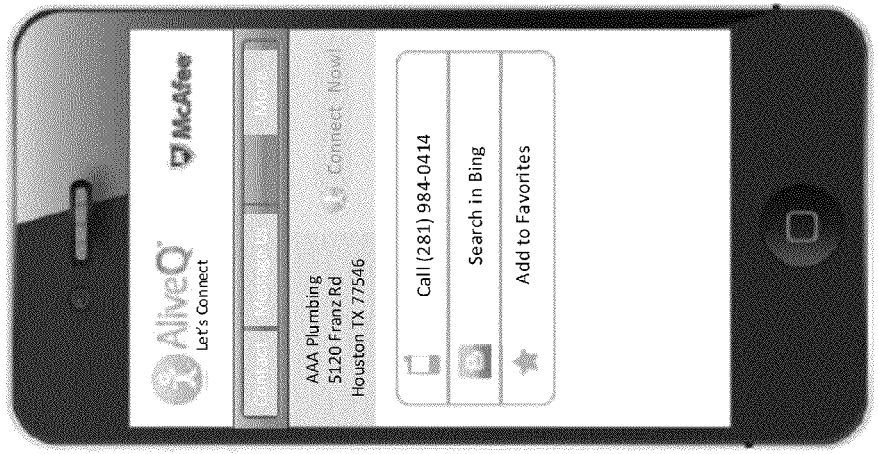
FIG. 16 illustrates another screenshot of an app configured to connect users with third parties via a mobile device.
Figures 18, 19:
FIG. 18 illustrates another screenshot of an app configured to connect users with third parties via a mobile device, and an exemplary live chat exchange.
FIG. 19 illustrates another screenshot of an app configured to connect users with third parties via a mobile device, and an exemplary live chat exchange.

FIGS. 16-19 illustrate a number of screenshots that show an embodiment in which a user (i.e., "Joe Smith") can search for a plumber. As shown in FIG. 16, the user has located a plumber (i.e., Adam's Plumbing Co.) using any of the methods described herein. By selecting the tab "Contact," the user can either call the business, search for more information about the business (e.g., using a search engine such as BING™), and/or add that business to his "favorites." If the user elects to contact the business using the messaging service, the user can select the tab "Message Us" and be prompted to enter in certain information, either by text or voice entry. This information can include, for example, name, email, and details about the service, products, or other information sought by the user. FIGS. 18 and 19 show exemplary screenshots of a live chat exchange between the user and the business. In this exchange, for example, the user identifies a part that he is seeking and the business responds by advising the user that the part is in stock and available.

A message can also be left for the business and that message will be delivered to the third party (e.g., the person, business, or service) so that the third party can respond to the message at their earliest opportunity. Alternatively, an intermediary answering service can be offered to the consumer, so that a live answering service can be immediately contacted by the user. In such embodiments, the live answering service can be equipped with knowledge of the third party (including, for example, knowledge of their hours of operation, scheduling requirements, etc.), so that they can assist in answering the potential customer's question, or just otherwise capturing a new lead (e.g., a potential business lead or other benefit) for the third party. In other embodiments, automated information can be sent directly to the app for display by the potential customer. For example, the system can text, download, or otherwise deliver relevant information about the business (hours, contact information, scheduling requirements) directly to the user in response to the direct connection provided by this service.

In some embodiments, the app can be combined with other features described herein to permit a user to select a desired interface for connection with a business. Thus, for example, in one embodiment, an app can connect a user with businesses via chat, click-to-call, and/or the IV interaction discussed above.

In addition, in some embodiments, the IVR interface can configured so that landline users (or other non-smartphone users) can access the IVR interface by dialing a particular number. Accordingly, in such embodiments, instead of dialing a conventional telephone information service number, the landline user can dial a number that connects them to the IVR interface for simple and easy direct connections to businesses.

Figure 20:
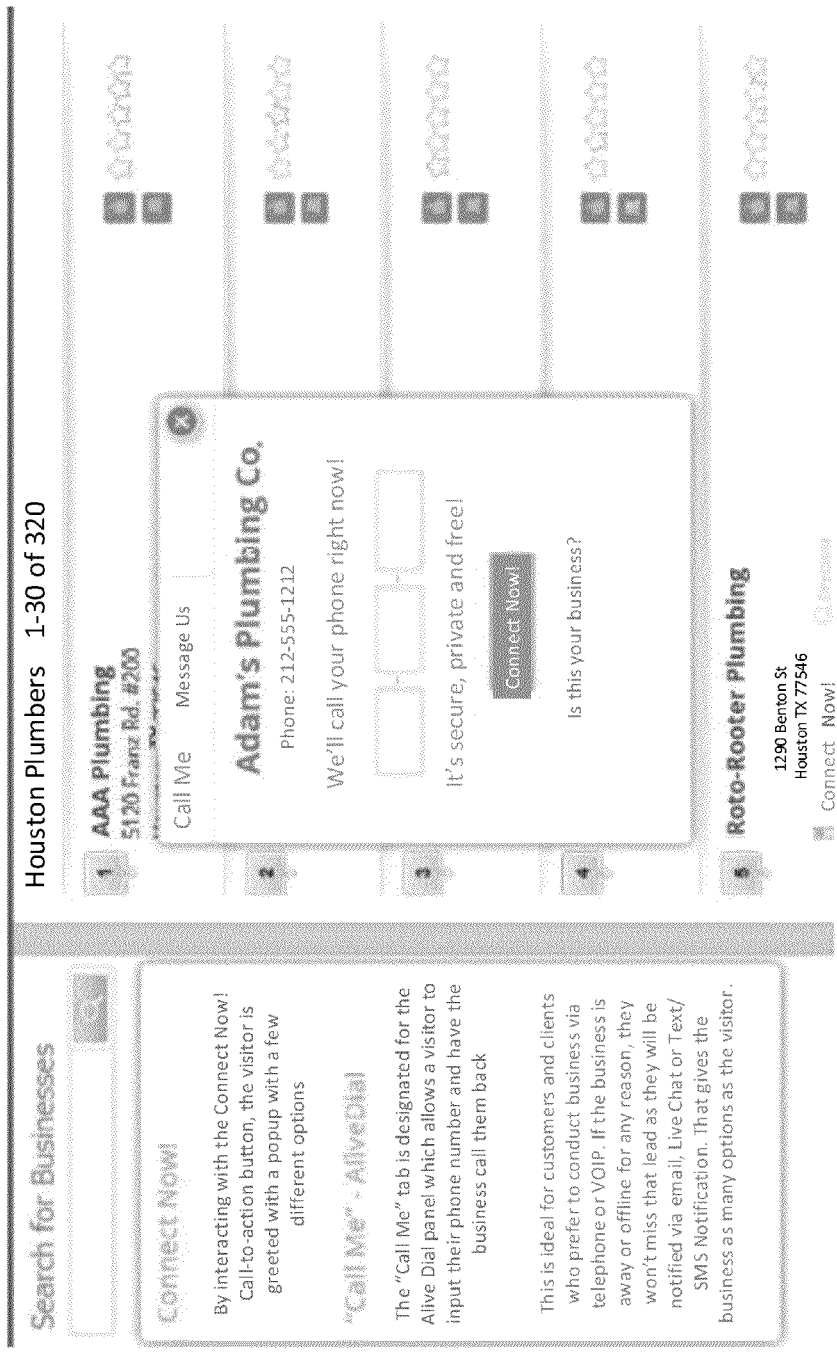
FIGS. 20-22 illustrate various screenshots of a website enable to contact users with various third parties.
Figure 21:
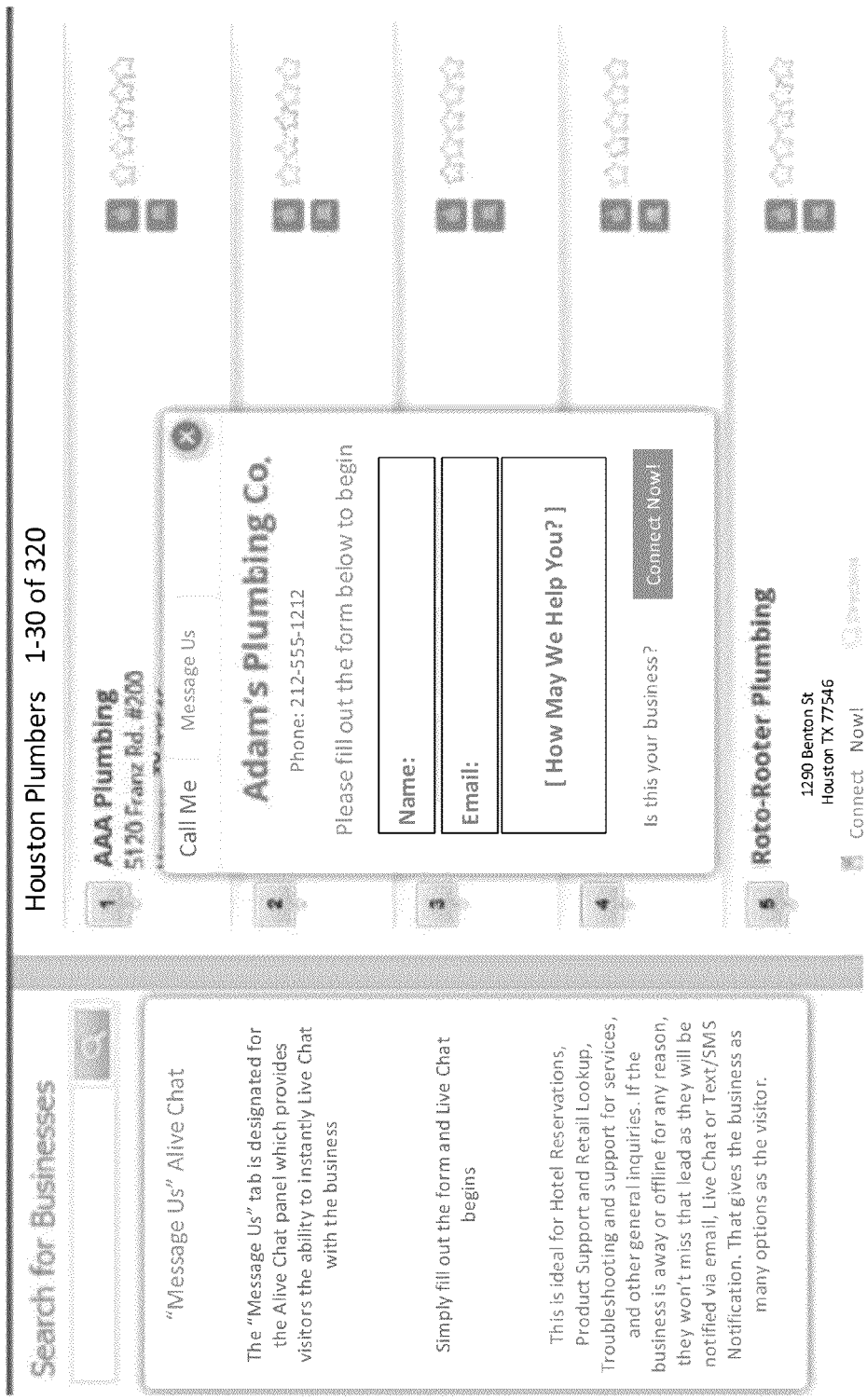
Figure 22:
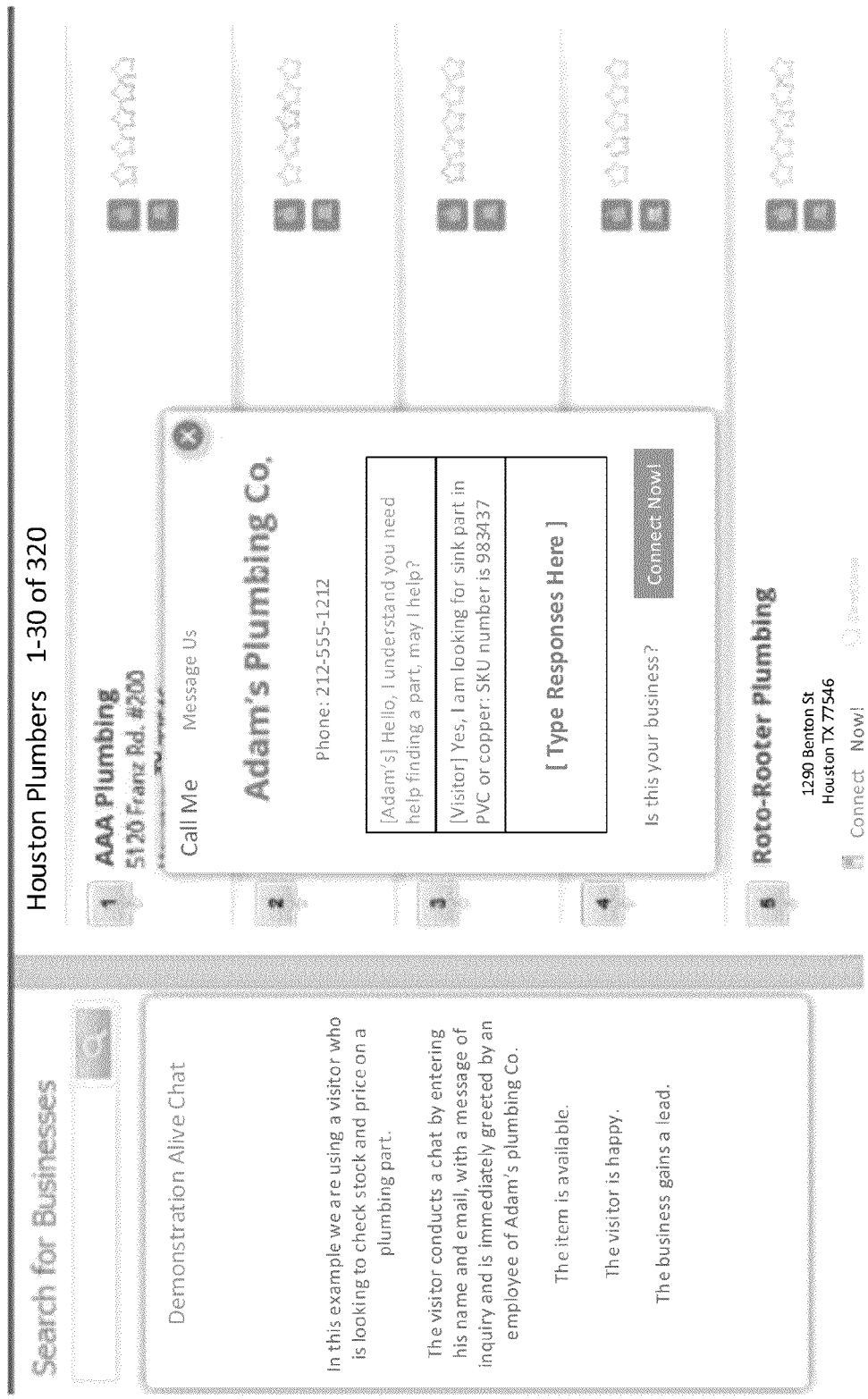

In other embodiments, the features discussed above can be accessed via a website-based system in much the same manner as the app described above. FIGS. 20-22 disclose screenshots of an exemplary website-based system that facilitates connections similar to those described in other embodiments herein. For example, FIG. 20 illustrates a directory listing search by keyword and/or location using the "Search for Business" search selection. After searching for a business, the system can return the search results and provide the user with the capability to get in contact with the business instantly via, for example, instant live chat or instant dialing of the business' telephone number.

After selecting one of the retrieved search results (e.g., "Adam's Plumbing Co."), a user can select a "call me" tab to enter their phone number to receive a return call, as shown in FIG. 20, or a "message us" tab to begin a live chat session with the business, as shown in FIG. 21. FIG. 22 shows an exemplary screenshot of a live chat session between a user and a business.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A method of connecting users with third parties using a mobile device, the method comprising:
    prompting a user to enter search information on the mobile device about a commercial entity that the user is seeking to contact;
    receiving the search information from the user via the mobile device;
    retrieving commercial entity information from a remote database;
    conveying information about one or more commercial entities to the user based on the retrieved commercial entity information;
    receiving an indication from the user that the user would like to connect with one of the commercial entities conveyed to the user; and
    initiating a live chat communication connection between the user and the indicated commercial entity.

2. The method of claim 1, wherein the initiation of the communication connection further comprises initiating a telephone call between the user and the entity.

3. The method of claim 1, wherein the initiation of the communication connection comprises initiating a call-back messaging request, the method comprising:
    receiving call-back information from the user and delivering the call-back information to the entity, the call-back information including a name and contact telephone number of the user.

4. The method of claim 1, wherein the prompting of the user to enter search information includes providing the user with an audio prompt; and the receiving of the search information from the user includes receiving a voice command from the user.

5. The method of claim 1, wherein the initiation of the communication connection comprises initiating a reservation service, the method further comprising receiving information about a reservation desired by the user and conveying that information to the entity.

6. The method of claim 1, further comprising receiving a request from the user for directional information about the indicated entity, and, in response, conveying direction information about a location of the indicated entity to the user.

7. The method of claim 1, further comprising providing identifying information about businesses or services in the immediate vicinity of the user.

8. The method of claim 7, wherein the identifying information about businesses or services in the immediate vicinity of the user is limited to businesses within 10 miles of the user.

9. The method of claim 7, wherein the identifying information about businesses or services in the immediate vicinity of the user is limited to businesses within 5 miles of the user.

10. The method of claim 7, wherein the identifying information about businesses or services in the immediate vicinity is provided when the act of retrieving entity information from a remote database does not result in any entities that can be conveyed to the user.

11. A handheld computing device comprising tangible, machine-readable media comprising code that can be executed by a processor contained in the handheld computing device, the code being executed to perform the steps of:
 prompting a user to enter search information on the mobile device about a commercial entity that the user is seeking to contact;
 receiving the search information from the user via the mobile device;
 retrieving commercial entity information from a remote database;
 conveying information about one or more commercial entities to the user based on the retrieved commercial entity information;
 receiving an indication from the user that the user would like to connect with one of the commercial entities conveyed to the user; and
 initiating a live chat communication connection between the user and the indicated commercial entity.

12. The handheld computing device of claim 11, wherein the initiation of the communication connection further comprises initiating a telephone call between the user and the entity.

13. The handheld computing device of claim 11, wherein the initiation of the communication connection comprises initiating a call-back messaging request, the tangible, machine-readable media comprising code executed to perform the step of receiving call-back information from the user and delivering the call-back information to the entity, the call-back information including a name and contact telephone number of the user.

14. The handheld computing device of claim 11, wherein the prompting of the user to enter search information includes providing the user with an audio prompt; and the receiving of the search information from the user includes receiving a voice command from the user.

15. The handheld computing device of claim 11, wherein the initiation of the communication connection comprises initiating a reservation service, the tangible, machine-readable media comprising code executed to perform the step of receiving information about a reservation desired by the user and conveying that information to the entity.

16. The handheld computing device of claim 11, the tangible, machine-readable media comprising code executed to perform the steps of receiving a request from the user for directional information about the indicated entity, and, in response, conveying direction information about a location of the indicated entity to the user.

17. The handheld computing device of claim 11, the tangible, machine-readable media comprising code executed to perform the step of providing identifying information about businesses or services in the immediate vicinity of the user.

18. The handheld computing device of claim 11, wherein the identifying information about businesses or services in the immediate vicinity of the user is limited to businesses within 10 miles of the user.

19. The handheld computing device of claim 11, wherein the identifying information about businesses or services in the immediate vicinity of the user is limited to businesses within 5 miles of the user.

20. The handheld computing device of claim 11, wherein the identifying information about businesses or services in the immediate vicinity is provided when the act of retrieving entity information from a remote database does not result in any entities that can be conveyed to the user.

\* \* \* \* \*